(12) United States Patent
Eltoft

(10) Patent No.: US 10,909,240 B2
(45) Date of Patent: Feb. 2, 2021

(54) BUILDING MANAGEMENT SYSTEM WITH MALICIOUS USER DETECTION AND PREVENTION

(71) Applicant: Johnson Controls Technology Company, Milwaukee, WI (US)

(72) Inventor: Justin D. Eltoft, Pleasant Prairie, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 131 days.

(21) Appl. No.: 15/845,913

(22) Filed: Dec. 18, 2017

(65) Prior Publication Data

US 2019/0188378 A1    Jun. 20, 2019

(51) Int. Cl.

| | |
|---|---|
| *G06F 21/55* | (2013.01) |
| *G06N 99/00* | (2019.01) |
| *H04L 12/28* | (2006.01) |
| *G06N 20/00* | (2019.01) |
| *G06F 21/31* | (2013.01) |

(52) U.S. Cl.
CPC .......... *G06F 21/554* (2013.01); *G06F 21/316* (2013.01); *G06N 20/00* (2019.01); *H04L 12/2832* (2013.01); *G06F 2221/034* (2013.01)

(58) Field of Classification Search
CPC .... G06F 2/50; G06F 21/554; G06F 2221/034; G06F 21/316; G06N 20/00; H04L 12/2832

See application file for complete search history.

(56) References Cited

U.S. PATENT DOCUMENTS

| | | | | |
|---|---|---|---|---|
| 5,430,827 | A  * | 7/1995 | Rissanen | G06F 3/16 |
| | | | | 704/246 |
| 6,552,647 | B1 * | 4/2003 | Thiessen | G05B 15/02 |
| | | | | 122/448.1 |
| 9,799,153 | B1 * | 10/2017 | Worrall | G07C 9/00031 |
| 2007/0250920 | A1 * | 10/2007 | Lindsay | G06F 21/31 |
| | | | | 726/7 |
| 2007/0293208 | A1 * | 12/2007 | Loh | H04L 12/282 |
| | | | | 455/419 |
| 2008/0209227 | A1 * | 8/2008 | Venkatesan | H04L 9/3231 |
| | | | | 713/186 |
| 2010/0131279 | A1 * | 5/2010 | Pilz | G06F 21/32 |
| | | | | 704/273 |
| 2010/0262297 | A1 * | 10/2010 | Shloush | H05B 47/175 |
| | | | | 700/276 |

(Continued)

*Primary Examiner* — Shanto Abedin
(74) *Attorney, Agent, or Firm* — Foley & Lardner LLP

(57) ABSTRACT

A building management system (BMS) includes a user access point configured to receive a user input corresponding to the BMS. The system includes at least one building subsystem in communication with the user access point and configured to control subsystem equipment in response to the user input. Additionally, the system includes a controller configured to: receive the user input, and receive access point data. The controller is further configured to compare the user input and access point data to a user profile and/or an equipment profile. Additionally, the controller is configured to determine a safety value using the comparison, and determine if the safety value is outside of a predetermined safety range. If the safety value is outside of the predetermined safety range, the controller is configured to initiate a verification process.

20 Claims, 12 Drawing Sheets

(56) References Cited

U.S. PATENT DOCUMENTS

| | | | |
|---|---|---|---|
| 2010/0324962 A1* | 12/2010 | Nesler | G06Q 30/0202 705/7.36 |
| 2011/0047418 A1* | 2/2011 | Drees | G05B 23/00 714/57 |
| 2012/0259466 A1* | 10/2012 | Ray | G05B 15/02 700/275 |
| 2012/0259583 A1* | 10/2012 | Noboa | G05B 15/02 702/179 |
| 2013/0102283 A1* | 4/2013 | Lau | H04W 12/06 455/411 |
| 2015/0279134 A1* | 10/2015 | Warren | G08C 17/02 340/5.85 |
| 2015/0369504 A1* | 12/2015 | Flaherty | F24F 11/62 700/277 |
| 2016/0018805 A1* | 1/2016 | Kuoppala | H02J 3/14 700/275 |
| 2018/0198841 A1* | 7/2018 | Chmielewski | H04L 12/2818 |
| 2018/0253569 A1* | 9/2018 | Swierk | G06F 21/86 |

* cited by examiner

BUILDING MANAGEMENT SYSTEM WITH MALICIOUS USER DETECTION AND PREVENTION

BACKGROUND

The present disclosure relates generally to building management systems (BMS) and associated devices. More particularly, the present disclosure relates to monitoring and assessing user activity directed to a building management system.

Building management systems are commonly used within buildings to automatically monitor and control various building functions. Typically, a BMS includes a controller and several building subsystems. Building subsystems may include a building electrical subsystem, an information communication technology (ICT) subsystem, a security subsystem, a HVAC subsystem, a lighting subsystem, a lift/escalators subsystem, and/or a fire safety subsystem.

As building management systems become increasingly automated and complex, it becomes difficult to monitor and protect the building controls from malicious usage. If an unauthorized user gained access to a user account (e.g., an administrative account), they may be able to change parameters within the building subsystems which could have potentially severe implications.

As one example, an unauthorized user may use a stolen login ID and password to access an administrative account. If the unauthorized user intends to disrupt building subsystems, they may be able to change specific equipment parameters to cause things such as turning on the sprinkler system, disabling elevator functions, unlocking access doors, or increasing room temperatures. Accordingly, it would be advantageous to detect unusual user and/or system behavior to prevent malicious use from impacting the building.

SUMMARY

One implementation of the present disclosure is a building management system (BMS). The system includes a user access point configured to receive a user input corresponding to the BMS. The system further includes at least one building subsystem in communication with the user access point and configured to control subsystem equipment in response to the user input. Additionally, the system includes a controller configured to receive the user input, and receive access point data corresponding to the user access point. The controller is further configured to compare the user input and access point data to at least one of a user profile and an equipment profile. Additionally, the controller is configured to determine a safety value using the comparison, and determine if the safety value is outside of a predetermined safety range. In response to a determination that the safety value is outside of the predetermined safety range, the controller is configured to initiate a verification process.

In some embodiments, the access point data includes at least one of a user ID, a time corresponding to the user input, and an access point location. In some embodiments, the user profile corresponds to the user ID and comprises a user access level.

In some embodiments, the access point data includes a user ID corresponding to the user profile, the verification process executed by the controller and further including accessing contact information associated with at least one of the user ID and an authorized user. The verification process further including contacting a device corresponding to the contact information and requesting a verification response, and controlling the subsystem equipment using the user input upon receipt of the verification response.

In some embodiments, the safety value includes factors associated with at least one of impact of user input, frequency of user input, speed of user input, location of user input, and type of user input.

In some embodiments, a machine learning module is configured to generate the at least one user profile and equipment profile using a machine learning algorithm. In some embodiments, the machine learning algorithm uses training data corresponding to prior user inputs.

In some embodiments, the system may include a first building subsystem with a first predetermined safety range and a second building subsystem with a second predetermined safety range, the second predetermined safety range different than the first predetermined safety range.

Another implementation of the present disclosure is a method for monitoring and assessing user activity directed to a building management system (BMS), the method including receiving a user input from a user access point, and receiving access point data corresponding to the user access point. The method further including comparing the user input and access point data to at least one of a user profile and an equipment profile. Additionally, the method includes calculating a safety value using the comparison, and determining if the safety value is outside of a predetermined safety range. The method further includes responding to a determination that the safety value is outside of the predetermined safety range by initiating a verification process, receiving a verification response, and controlling an equipment parameter within the BMS upon receiving the verification response. Additionally, the method includes responding to a determination that the safety value is within the predetermined safety range by controlling an equipment parameter within the BMS.

In some embodiments, the access point data includes at least one of a user ID, a time corresponding to the user input, and an access point location. In some embodiments, the user profile corresponding to the user ID and including a user access level. In some embodiments, the verification process further includes accessing contact information associated with the user ID, and contacting a device corresponding to the contact information and requesting the verification response.

In some embodiments, the method further includes assigning weights to safety value criteria, the safety value criteria comprising at least one of user access level and predicted impact of controlling the equipment parameter.

In some embodiments, the method further includes generating the at least one user profile and equipment profile using a machine learning model. In some embodiments, the method includes using prior user inputs as training data for a machine learning algorithm.

Another implementation of the present disclosure is a method for monitoring and assessing user activity directed to a building management system (BMS). The method includes receiving a user input from a user access point, and comparing the user input to at least one of a user profile and an equipment profile. The method further includes calculating a safety value using the comparison, and determining if the safety value is outside of a predetermined safety range. Additionally, the method includes responding to a determination that the safety value is outside of the predetermined safety range by initiating a verification process, and controlling an equipment parameter within the BMS upon completion of the verification process.

In some embodiments, the equipment parameter corresponds to a building subsystem, the building subsystem including at least one of fire safety, lighting, lifts and escalators, security, HVAC, electrical, and information communication technology (ICT).

In some embodiments, the verification process includes contacting an authorized user using at least one of email, text message, and automated phone call. In some embodiments, the verification process further includes receiving a verification response from the at least one email, text message, and automated phone call prior to controlling the equipment parameter.

In some embodiments, the method includes training a machine learning model using user input data and equipment data, and generating the at least one user profile and equipment profile using the machine learning model.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, systems and methods for monitoring and assessing user activity within a building management system (BMS) are shown, according to various exemplary embodiments. As described above, it can be difficult to determine when a user is interacting with a BMS "normally" versus maliciously. An unauthorized user that gains access to a user login may inflict a number of significant building changes before being apprehended.

By determining "normal use," by specific users and/or relating to specific equipment, a BMS may be able to detect abnormal use, and accordingly, initiate additional security measures prior to implementing any building or equipment changes. User and/or equipment profiles may be generated that reflect normal use. By combining profile information with current user inputs, a BMS may be able to determine factors including 1) What location is the user making changes from (e.g., IP address, geolocation, time zone, GPS location)? 2) What times of day (or year, or days of the week) does the identified user typically make changes to various parts of the system? 3) Regardless of access, how often does the identified user typically update the specific equipment parameter, or over-ride default settings? 4) Are there certain changes that are "safe" when done a few places within the BMS, but if you do many, it could indicate an attack? 5) How quickly are parameters being changed and what is the size of the potential impact?

The present disclosure includes systems and methods for assessing user patterns and intent while interacting with a BMS. Advantageously, the systems and methods described herein may enable a BMS to stop a potential malicious use or attack by an unauthorized user. This can minimize any effects (if any) that result from the unauthorized user. Accordingly, the systems and methods can prevent costly damages to equipment, among other things.

Building HVAC Systems and Building Management Systems

Figure 1:
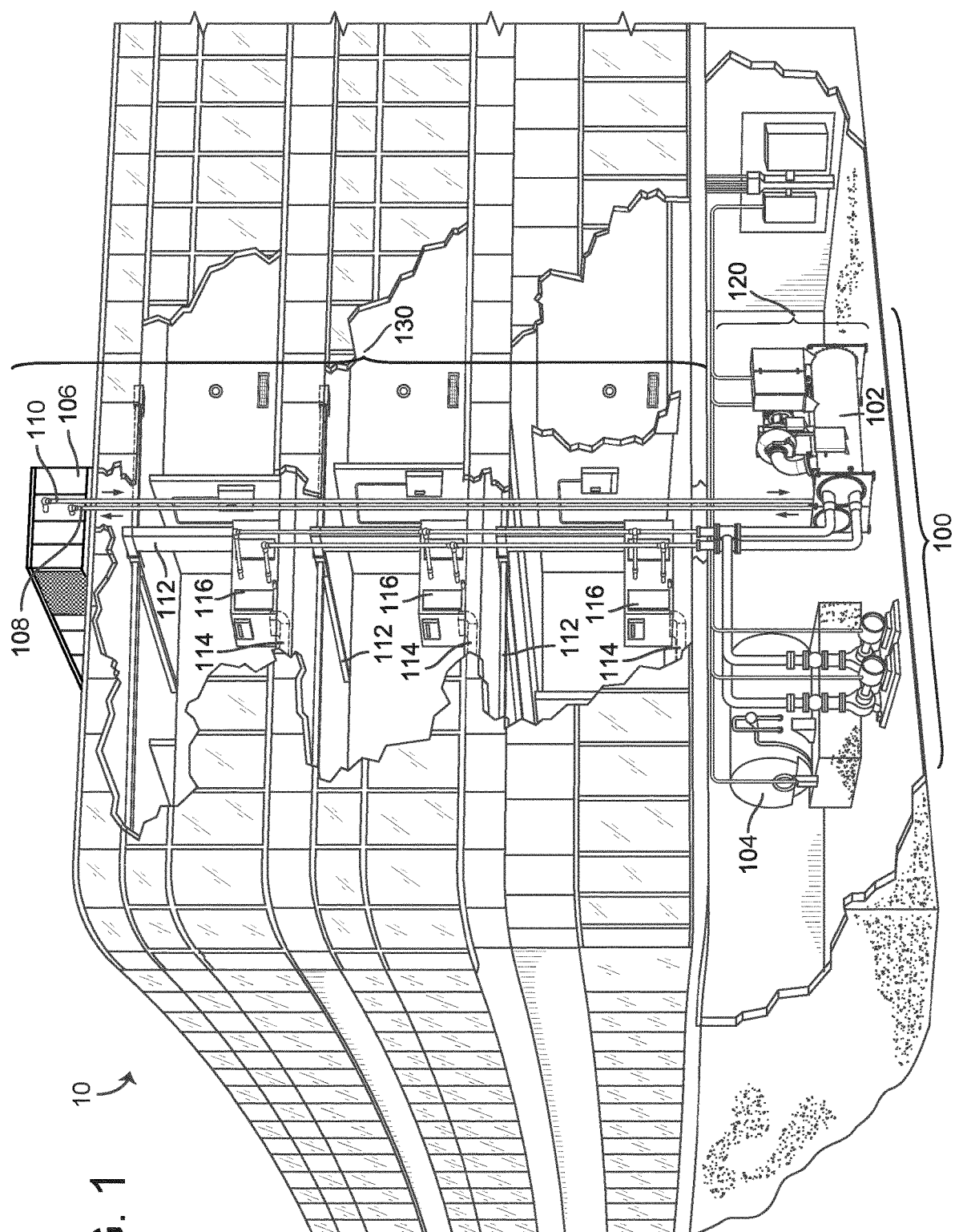
FIG. 1 is a drawing of a building equipped with a HVAC system, according to some embodiments.
Figure 2:
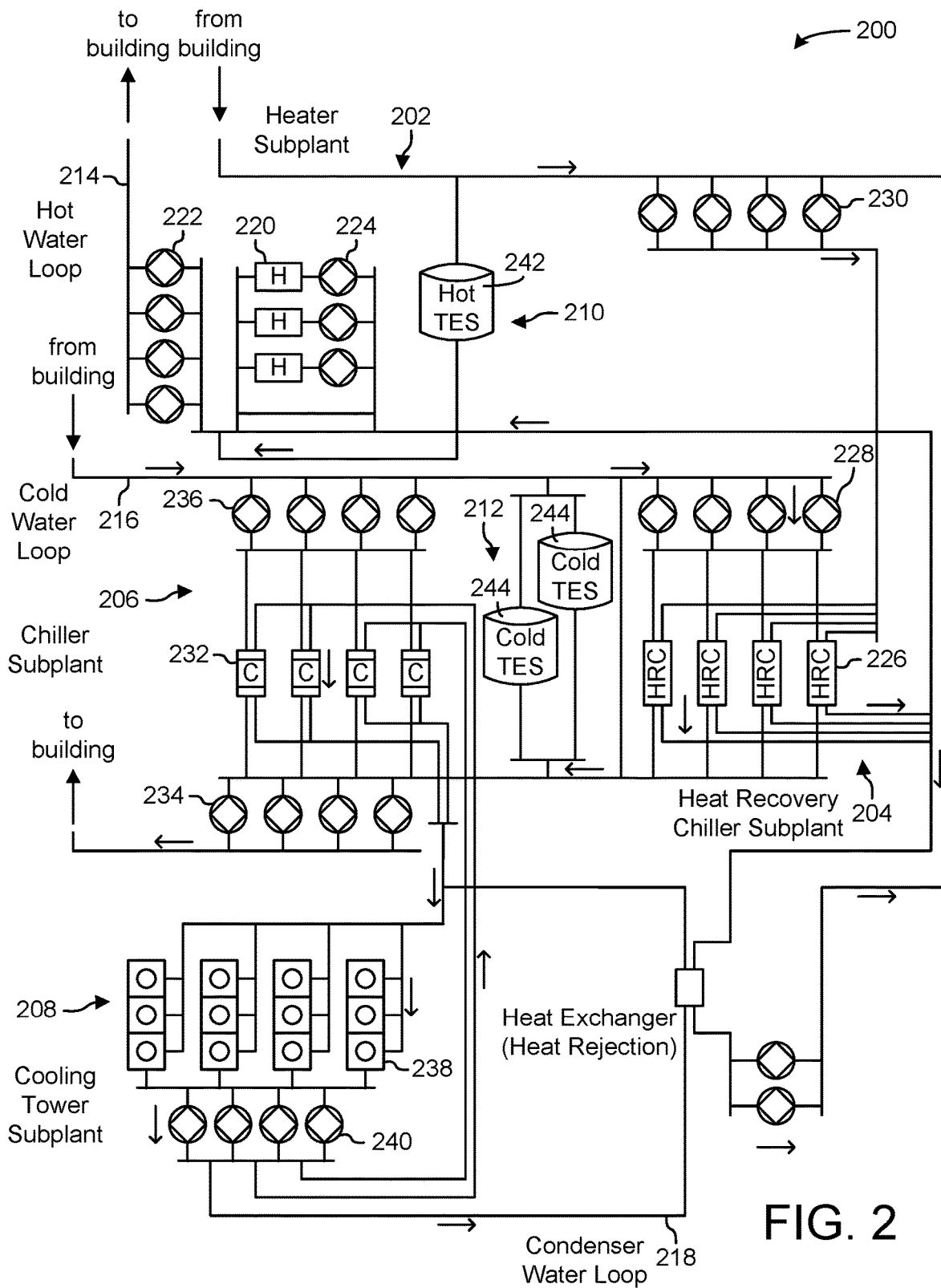
FIG. 2 is a block diagram of a waterside system that may be used in conjunction with the building of FIG. 1, according to some embodiments.
Figure 3:
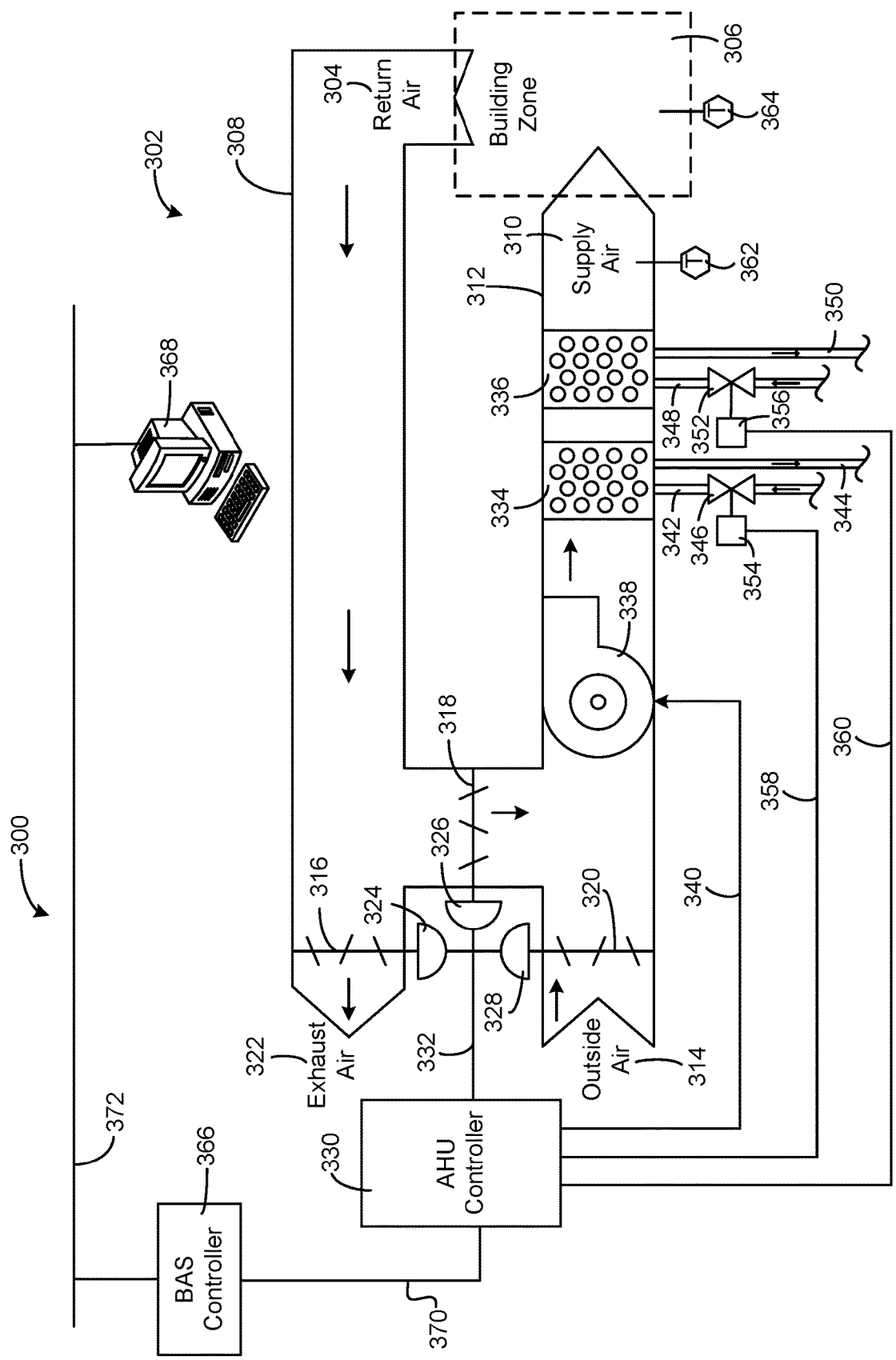
FIG. 3 is a block diagram of an airside system that may be used in conjunction with the building of FIG. 1, according to some embodiments.
Figure 4:
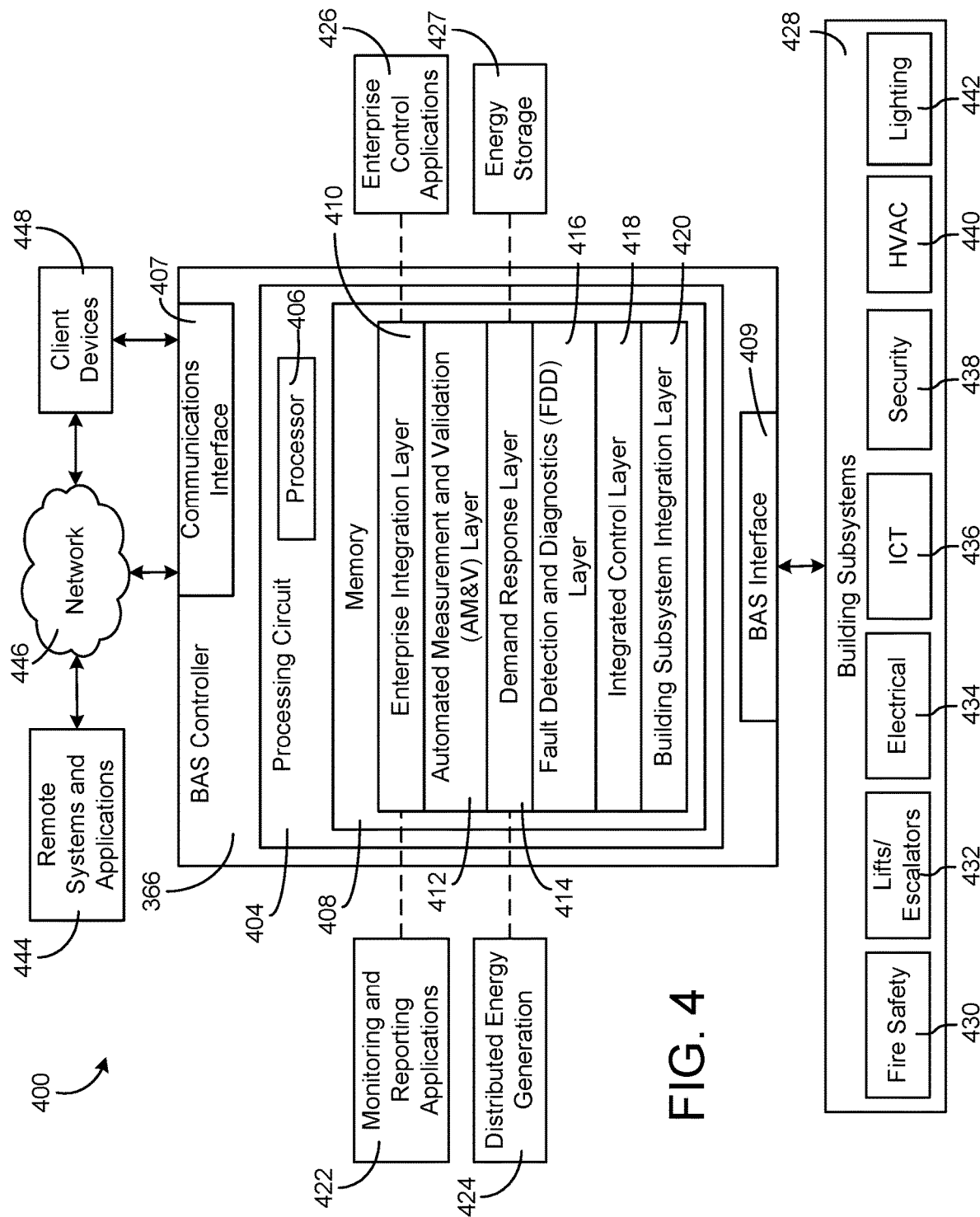
FIG. 4 is a block diagram of a building management system (BMS) which may be used to monitor and control the building of FIG. 1, according to some embodiments.

Referring now to FIGS. 1-4, several building management systems (BMS) and HVAC systems in which the systems and methods of the present disclosure may be implemented are shown, according to some embodiments. In brief overview, FIG. 1 shows a building 10 equipped with a HVAC system 100. FIG. 2 is a block diagram of a waterside system 200 which may be used to serve building 10. FIG. 3 is a block diagram of an airside system 300 which may be used to serve building 10. FIG. 4 is a block diagram of a BMS which may be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS may include, for example, a HVAC system, a security system, a lighting system, a fire alerting system, any other system that is capable of managing building functions or devices, or any combination thereof.

The BMS that serves building 10 includes a HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which may be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that may be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or may be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 may be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves may be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or may be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and may be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 may be configured to operate exhaust air damper 316, mixing damper 318, and outside air damper 320 to control an amount of outside air 314 and return air 304 that combine to form supply air 310. Any return air 304 that does not pass through mixing damper 318 may be exhausted from AHU 302 through exhaust damper 316 as exhaust air 322.

Each of dampers 316-320 may be operated by an actuator. For example, exhaust air damper 316 may be operated by actuator 324, mixing damper 318 may be operated by actuator 326, and outside air damper 320 may be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that may be collected, stored, or used by actuators 324-328. AHU controller 330 may be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 may be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 may be positioned along piping 342 or piping 344 to control a flow rate of the chilled fluid through cooling coil 334. In some embodiments, cooling coil 334 includes multiple stages of cooling coils that may be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 may be positioned along piping 348 or piping 350 to control a flow rate of the heated fluid through heating coil 336. In some embodiments, heating coil 336 includes multiple stages of heating coils that may be independently activated and deactivated (e.g., by AHU controller 330, by BMS controller 366, etc.) to modulate an amount of heating applied to supply air 310.

Each of valves 346 and 352 may be controlled by an actuator. For example, valve 346 may be controlled by actuator 354 and valve 352 may be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 may be separate (as shown in FIG. 3) or integrated. In an integrated implementation, AHU controller 330 may be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that may be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 may be a computer workstation, a client terminal, a remote or local interface, or any other type of user interface device. Client device 368 may be a stationary terminal or a mobile device. For example, client device 368 may be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 may be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 may be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 may be direct (e.g., local wired or wireless communications) or via a communications network 446 (e.g., a WAN, the Internet, a cellular network, etc.). For example, interfaces 407, 409 may include an Ethernet card and port for sending and receiving data via an Ethernet-based communications link or network. In another example, interfaces 407, 409 may include a Wi-Fi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 may be communicably connected to BMS interface 409 and/or communications interface 407 such that processing circuit 404 and the various components thereof may send and receive data via interfaces 407, 409. Processor 406 may be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 may be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 may be distributed across multiple servers or computers (e.g., that may exist in distributed locations). Further, while FIG. 4 shows applications 422 and 426 as existing outside of BMS controller 366, in some embodiments, applications 422 and 426 may be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 may be configured to serve clients or local applications with information and services to support a variety of enterprise-level applications. For example, enterprise control applications 426 may be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 may work with layers 410-420 to optimize building performance (e.g., efficiency, energy use, comfort, or safety) based on inputs received at interface 407 and/or BMS interface 409.

Building subsystem integration layer 420 may be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions may be edited or adjusted by a user (e.g., via a graphical user interface) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 may be configured to provide calculated inputs (e.g., aggregations) to these higher levels based on outputs from more than one building subsystem.

Automated measurement and validation (AM&V) layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Monitoring and Assessing User Activity

Figure 5:
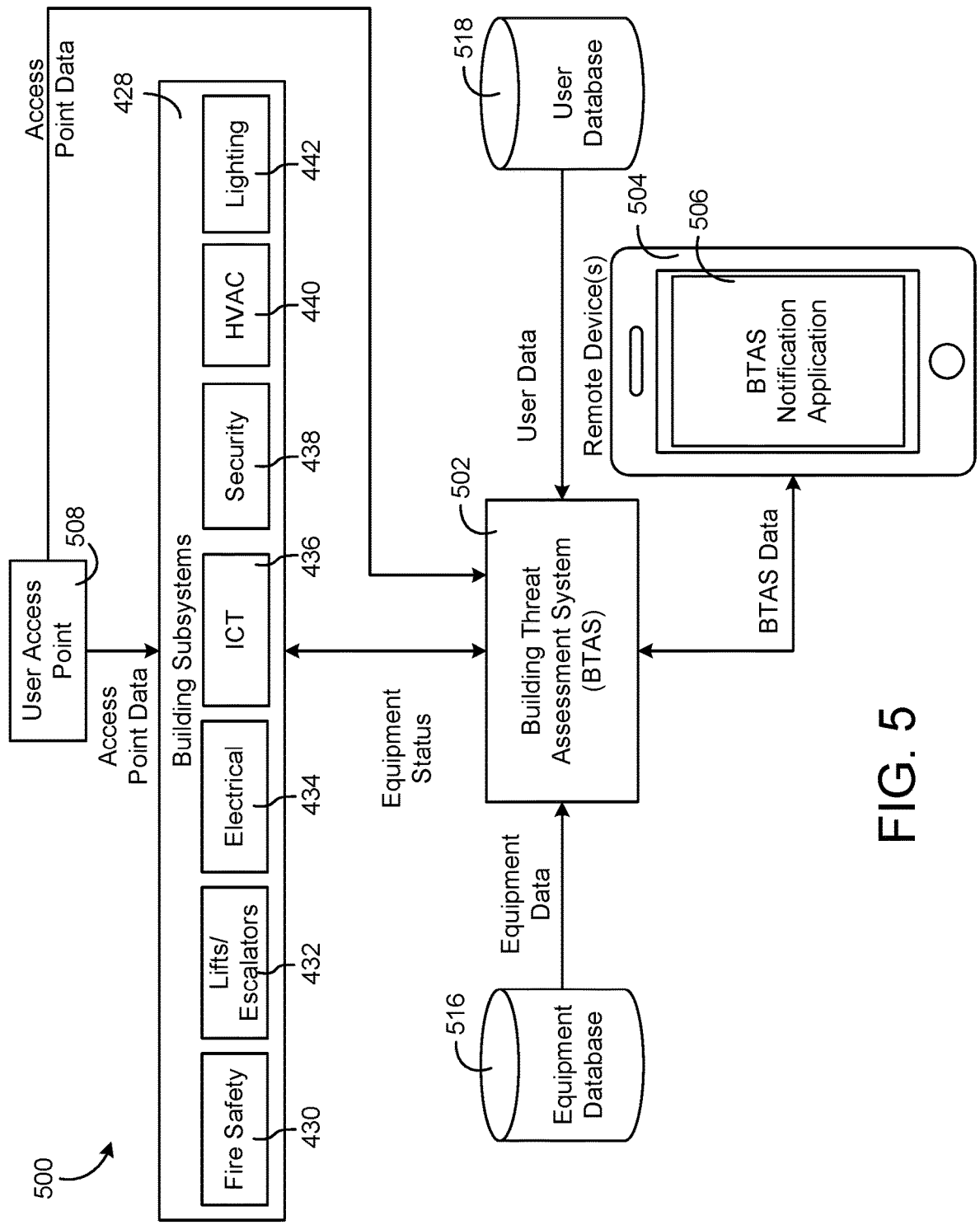
FIG. 5 is a block diagram of a building threat assessment system (BTAS) that may be implemented in the BMS of FIG. 4.

Referring now to FIG. 5, a block diagram of a system 500 including a user access point 508, building subsystems 428, building threat assessment system (BTAS) 502, and a remote device 504 is shown, according to some embodiments. System 500 may be implemented in HVAC system 100, waterside system 200, airside system 300, or BMS 400, as described with reference to FIGS. 1-4. In some embodiments, system 500 may be implemented within BMS controller 366. In some embodiments, system 500 is a component of BMS 400.

As shown, user access point 508 may communicate access point data to building subsystems 428 as well as to BTAS 502. A user may interact with BMS 400 via user access point 508. In some embodiments, user access point 508 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with BMS 400, its subsystems, and/or devices. User access point 508 may be a computer workstation, a client terminal, a remote or local interface, or any other type of user interface device. User access point 508 may be a stationary terminal or a mobile device. For example, user access point 508 may be a desktop computer, a computer server with a user interface, a laptop computer, a tablet, a smartphone, a PDA, or any other type of mobile or non-mobile device. User access point 508 may communicate with BMS controller 366 and/or AHU controller 330.

In some situations, a user may be prompted by the user access point 508 to input a login ID and/or password. This may occur when a user first attempts to interact with BMS 400. Upon gaining full access to user access point 508 (e.g., by logging in, hacking, etc.), a user may enter BMS inputs to user access point 508. As mentioned above, access point data may be communicated with building subsystems 428 and with BTAS 502. The access point data may include, for example, a user input, a user ID, a time corresponding to the user input, and an access point location. The access point data may be used by BTAS 502 to determine a "safety value" corresponding to the user input.

User inputs to BMS 400 may include changes to an equipment parameter (such as power, speed, flow rate, on/off, etc.). The equipment parameter may relate to equipment in at least one of the building subsystems 428. As one non-limiting example, a user input may be directed towards turning on fire sprinklers in a specific section of the building. In this way, the user input may include a desired change, as well as the equipment to be affected by the change.

Upon receiving access point data from user access point 508, building subsystems 428 may communicate relevant equipment statuses to BTAS 502. The equipment status may include current operating parameters for equipment identified by the access point data/user input. As one non-limiting example, the user input may be directed towards changing a flow rate within HVAC system 100. HVAC 440 (within building subsystems 428) may then output the present flow rate value of the valve to BTAS 502. Accordingly, BTAS 502 may use the equipment status to help determine the safety value corresponding to the user input.

Still referring to FIG. 5, BTAS 502 may be in communication with an equipment database 516 and a user database 518. BTAS 502 may use equipment database 516 to retrieve relevant equipment data. Similarly, BTAS 502 may use user database 518 to retrieve relevant user data. Specifically, BTAS 502 may use the equipment status to determine an equipment ID associated with the user input. Then, BTAS 502 may use equipment database 516 to retrieve data corresponding to the equipment ID such as published operating ranges, maintenance history, operating history, input history, or the like. Similarly, BTAS 502 may use the access point data to determine user data. The access point data may include the user login information, and user database 518 can provide associated user data, such as personal information, contact information, access privileges, user input history, and the like. Over time, user database 518 can accumulate more user input history, which can be used to increase the accuracy of any user profile that may be generated from the database data. Similarly, over time, equipment database 516 can accumulate more historical data (e.g., operating history, input history, maintenance history), which can be used to increase the accuracy of any equipment profile that may be generated from the database data.

BTAS 502 may use a plurality of inputs to determine a safety value corresponding to the current user input. In some embodiments, BTAS 502 may use any of the equipment status, access point data, equipment data, and user data, alone or in combination, to calculate a safety value. Additionally, BTAS 502 may place higher importance on certain factors used in determining the safety value. As one non-limiting example, BTAS may identify that the user input corresponds to a specific equipment ID. Using equipment database 516, BTAS 502 may determine the location of the equipment. When determining a current safety value, certain building locations may be more affected by equipment changes than other building locations (e.g., maliciously turning on a sprinkler system in a bathroom would not have the same impact as turning on the sprinkler system in a server room). Accordingly, BTAS 502 may consider certain factors more than others. As another non-limiting example, BTAS 502 may provide additional scrutiny to user inputs when user database 518 retrieves user data corresponding to an administrative user login (as opposed to a lower-level user login).

As an additional non-limiting example, BTAS 502 may identify that a user input corresponds to a user who, historically, only inputs changes to a specific building subsystem (e.g., lighting subsystem 442). BTAS 502 may also identify that the current user input corresponds to an equipment ID that is located within a different subsystem (e.g., security subsystem 438). This atypical user behavior may therefore affect the determined safety value for the user input. Over time, BTAS 502 may utilize more accurate user profiles (discussed in detail below) due to the increase in available user data, as stored within user database 518.

Once BTAS 502 determines a safety value, a decision may be made whether or not the user input should be implemented via the relevant equipment parameter. In some embodiments, a predetermined safety value range may be used to determine whether or not to implement the user input (e.g., if the safety value is outside of the predetermined range, additional verification may occur prior to changing an equipment parameter). In some embodiments, different building locations and/or equipment may have different predetermined safety value ranges. Referring to a previous example, a bathroom may have a different predetermined safety value range (e.g., "acceptable range") than a server room.

Should the safety value fall outside of the predetermined safety value range, additional verification of the user input may occur. As shown by FIG. 5, BTAS data may be communicated between BTAS 502 and a remote device (504). In some embodiments, BTAS data may be communicated to a plurality of remote devices 504 simultaneously. The BTAS data may inform an authorized user of the current user input at user access point 508, via a BTAS notification application 506. In some embodiments, the notification may occur via text message, email, and/or an automated phone call. In some situations, the authorized user may be prompted to verify that the user input was an intended result of their own actions (e.g., not malicious, accidental, or performed by another individual using a stolen login). In other situations, it may be beneficial to simply notify the authorized user that the user input occurred, without prompting the authorized user to respond to the notification. In some situations, BTAS 502 may prevent subsequent user inputs from the current location and/or user ID until verification from remote device 504 has been received. Similarly, BTAS 502 may prevent any relevant equipment parameters from changing until verification from remote device 504 has been received.

As one non-limiting example, a site manager may receive a text message on his cellphone (i.e. remote device 504) requesting him to verify a user input that was made using his account. The text message may provide any number of details, including time of user input, location of user access point 508, equipment status, intended changes to equipment parameters, etc. The site manager may be prompted, for example, to reply "YES" to the text message to confirm that the user input was done intentionally, or to reply "NO" to the text message to deny the implementation of the user input. Upon receiving the verification message "YES," BTAS 502 may then proceed to implement the user input corresponding to equipment parameters.

Conversely, upon receiving "NO," BTAS 502 may then proceed to deny the user input. In some embodiments, BTAS 502 may initiate a lock-out of the relevant user account. In some embodiments, BTAS 502 may block the relevant user access point 508 from communicating further user inputs to BMS 400. In some embodiments, BTAS 502 may initiate additional security measures upon receiving a "NO" reply.

In some situations, the authorized user may not respond timely to the verification request. Accordingly, BTAS 502 may have a predetermined waiting period, wherein the expiration of the waiting period results in BTAS 502 contacting a different authorized user. As one non-limiting example, BTAS 502 may identify that a user input having a safety value outside of the predetermined safety value range has originated from a contractor's user account. BTAS 502 sends a verification request to the contractor's email address, as retrieved from user database 518. After one hour, BTAS 502 has not received any communication in response to the verification request. Accordingly, BTAS 502 accesses user database 518 to retrieve the contact information for the site manager. The site manager then receives a separate verification request, corresponding to the original user input. In some situations, BTAS 502 may cancel the verification request upon the expiration of the predetermined waiting period, and may then proceed with implementing the user input. In some embodiments, BTAS 502 may have several different methods for handling non-responses, the method re-selected each non-response time based on the current safety value of the user input.

Figure 6:
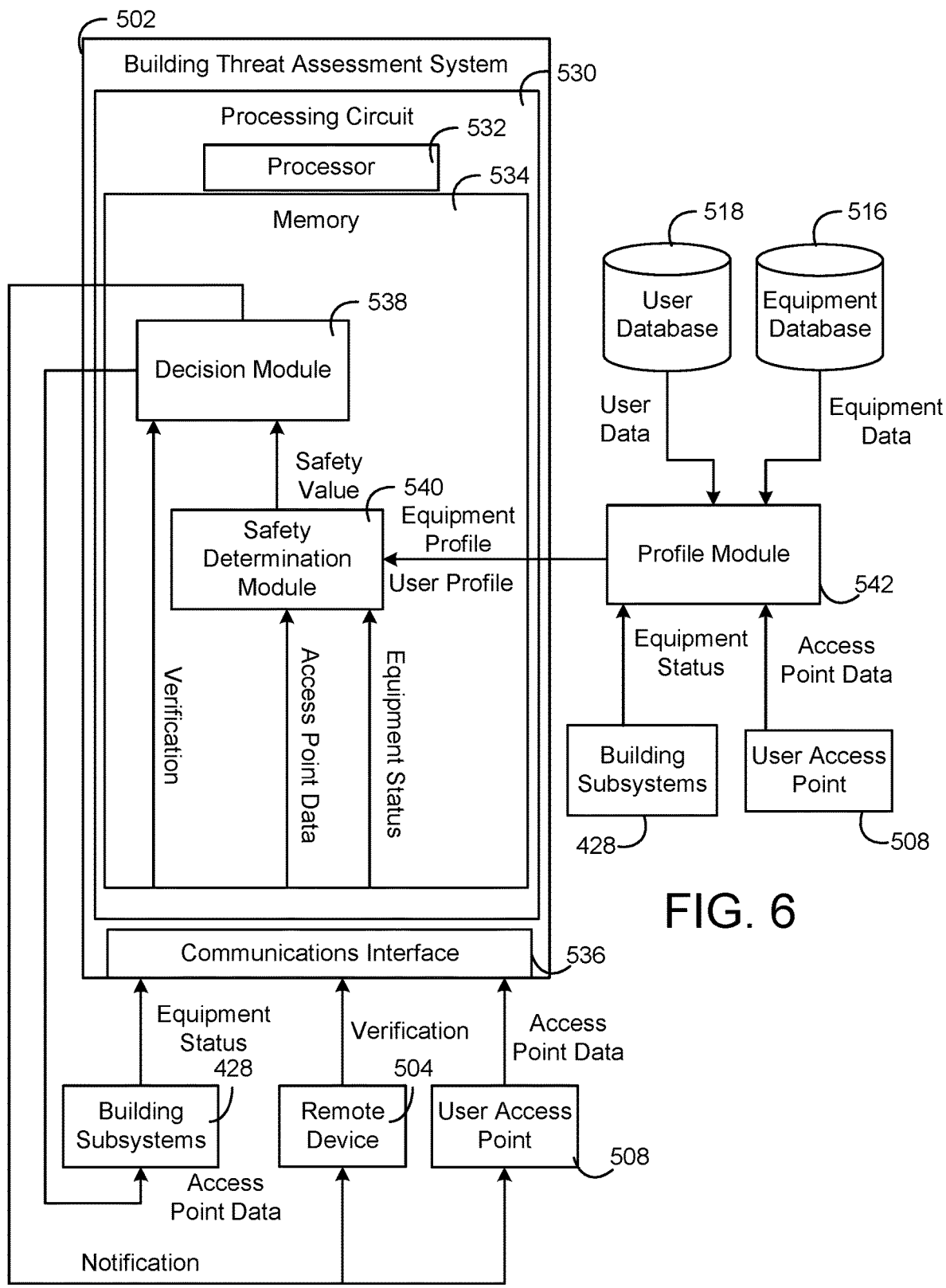
FIG. 6 is another block diagram of a building threat assessment system (BTAS) that may be implemented in the BMS of FIG. 4.

Referring now to FIG. 6, a block diagram illustrating building threat assessment system (BTAS) 502 in detail is shown, according to some embodiments. BTAS 502 may be part of BAS controller 366 in some embodiments. BTAS 502 is shown to include a communications interface 536 and a processing circuit 530. Communications interface 536 may include wired or wireless interfaces (e.g., jacks, antennas, transmitters, receivers, transceivers, wire terminals, etc.) for conducting data communications with various systems, devices, or networks. For example, communications interface 536 may include an Ethernet card and port for sending and receiving data via an Ethernet-based communications network and/or a WiFi transceiver for communicating via a wireless communications network. Communications interface 536 may be configured to communicate via local area networks or wide area networks (e.g., the Internet, a building WAN, etc.) and may use a variety of communications protocols (e.g., BACnet, IP, LON, etc.).

Communications interface 536 may be a network interface configured to facilitate electronic data communications between BTAS 502 and various external systems or devices (e.g., building subsystems 428, remote device 504, etc.). BTAS 502 may receive equipment status information from building subsystems 428, verification from remote device 504, and access point data from user access point 508. BTAS 502 may be configured to output access point data to building subsystems 428 (e.g., user inputs), as well as notifications (e.g., verification requests, lock-out notices) to remote device 504 and/or user access point 508. Further, BTAS 502 may receive equipment profiles and user profiles from profile module 542, which is discussed in detail below.

Processing circuit 530 is shown to include a processor 532 and memory 534. Processor 532 may be a general purpose or specific purpose processor, an application specific integrated circuit (ASIC), one or more field programmable gate arrays (FPGAs), a group of processing components, or other suitable processing components. Processor 532 may be configured to execute computer code or instructions stored in memory 534 or received from other computer readable media (e.g., CDROM, network storage, a remote server, etc.).

Memory 534 may include one or more devices (e.g., memory units, memory devices, storage devices, etc.) for storing data and/or computer code for completing and/or facilitating the various processes described in the present disclosure. Memory 534 may include random access memory (RAM), read-only memory (ROM), hard drive storage, temporary storage, non-volatile memory, flash memory, optical memory, or any other suitable memory for storing software objects and/or computer instructions. Memory 534 may include database components, object code components, script components, or any other type of information structure for supporting the various activities and information structures described in the present disclosure. Memory 534 may be communicably connected to processor 532 via processing circuit 530 and may include computer code for executing (e.g., by processor 532) one or more processes described herein.

Still referring to FIG. 6, profile module 542 may receive inputs including user data from user database 518, equipment data from equipment database 516, equipment status from building subsystems 428, and access point data from user access point 508 (including user inputs). In some embodiments, profile module 542 may have more inputs for use in the determination of equipment and/or user profiles. In other embodiments, profile module 542 may have less inputs than shown.

In some embodiments, profile module 542 may include a machine learning module. The machine learning module may use machine learning algorithms to output a unique equipment profile and/or a user profile. In some embodiments, the equipment profile may include typical operating values, typical operating times, typical users that input parameters, typical magnitude of changes, importance/criticality of equipment, related equipment, and equipment location, among others.

In some embodiments, the user profile may include typical access locations, typical access times, typical user inputs, typical input magnitudes, user access level, typical frequency of user inputs, and typical equipment or subsystems corresponding to user inputs, among others. In some situations, each user may have a unique user profile, which can be accessed by BTAS 502 using the unique user ID. However, in some situations, there may also be a "general" user profile that BTAS 502 may use to determine the current safety value. As one example, the general user profile may indicate that typical access times occur within business hours with typical access locations corresponding to computer workstations within the building. The general user profile may be used to determine a safety value when a unique user profile is not available. In some situations (e.g., with new users), there may not be sufficient data to generate an accurate user profile specific to a certain user.

As mentioned above, the equipment profile and/or the user profile may be used as inputs to BTAS 502. Specifically, in some embodiments, the equipment profile and/or the user profile may be used as inputs to a safety determination module 540. As shown, other inputs to safety determination module 540 may include access point data and equipment status. Safety determination module 540 may evaluate and compare access point data and equipment status to the equipment profile and/or the user profile to determine a safety value. As discussed, access point data may include a user input, a user ID, a time corresponding to the user input, and an access point location. Additionally, the equipment status may include current operating parameters for equipment identified by the access point data/user input.

As one non-limiting example, safety determination module 540 may compare the user input time to the typical access times corresponding to that user. For the same user input, the user access point location may be compared to typical access locations corresponding to that user. Further, the current equipment operating parameter(s) may be combined with the user input and compared to typical operating parameters for that specific equipment.

In some embodiments, each comparison made by safety determination module 540 may affect the final safety value differently (e.g., some factors are weighted differently). As one non-limiting example, a building may only have two users with administrative-level access to BMS 400. Accordingly, whenever safety determination module 540 encounters a user input corresponding to an administrative login, it may always output a safety value outside of the predetermined safety value range, regardless of the other factors being compared. In this example, an authorized user must then verify every user input occurring from an administrative login.

Still referring to FIG. 6, the safety value may be used as an input to decision module 538. Here, the safety value is compared to the relevant predetermined safety range, and BTAS 502 outputs either a notification/verification request, or instructs building subsystems 428 to implement the current user input.

As shown, decision module 538 may also include the user verification as an input. In this way, remote device 504 can reply to the verification request/notification and the initial output of decision module 538 can be changed, allowing building subsystems 428 to implement the user input.

Figure 7:
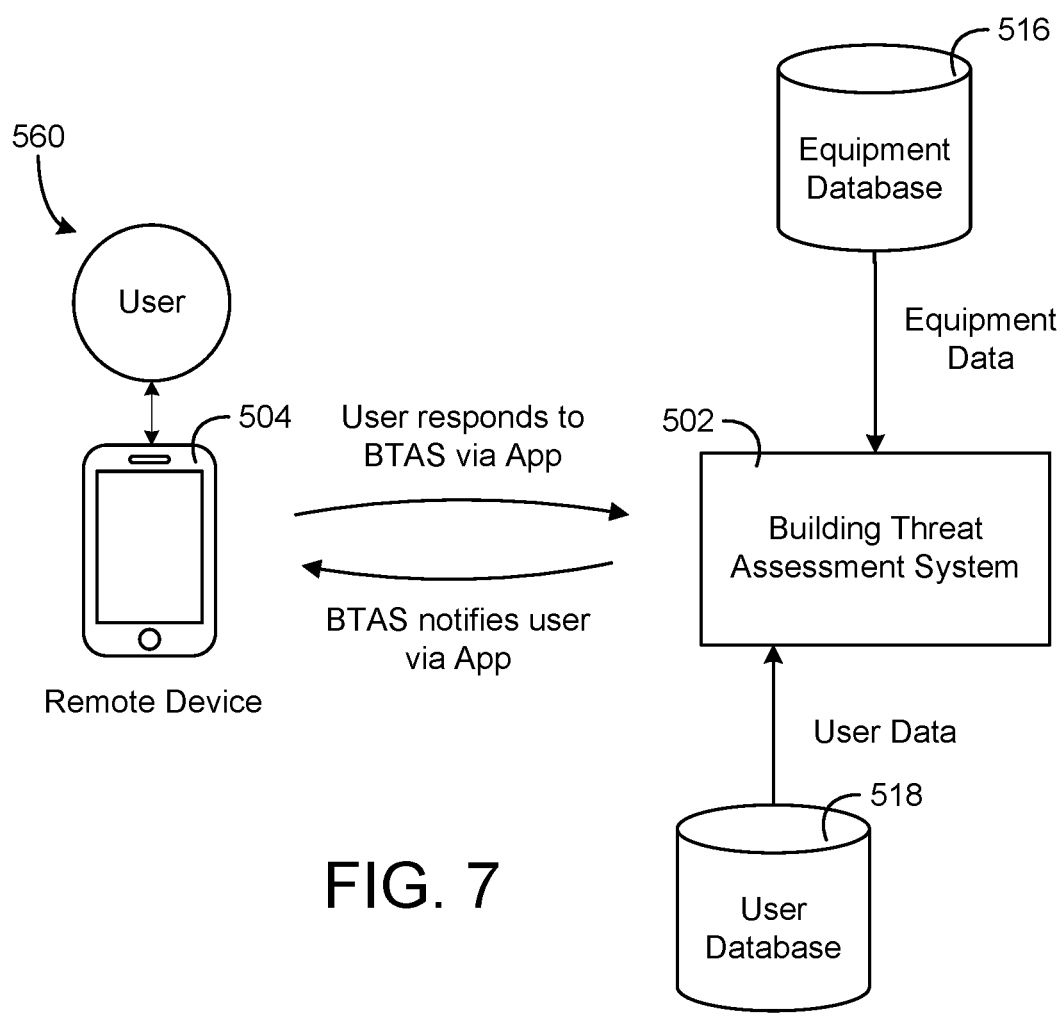
FIG. 7 is a block diagram of a remote device interacting with a building threat assessment system (BTAS) that may be implemented in the BMS of FIG. 4.

Referring now to FIG. 7, a simple block diagram of a remote device 504 interacting with BTAS 502 is shown. Here, BTAS 502 accesses equipment database 516 and user database 518. Upon calculating a safety value, BTAS 502 determines that additional verification of the user input is needed. Accordingly, BTAS 502 transmits a message to remote device 504. User 560 then engages with remote device 504, receives the message, and determines whether or not the user input is acceptable and/or intentional. User 560 then responds, via remote device 504, to BTAS 502. If user 560 replies with a positive verification, BTAS 502 may then implement the current user input. If user 560 replies negatively, BTAS 502 may then prevent the current user input from being implemented, and may initiate additional security measures.

Figure 8A:
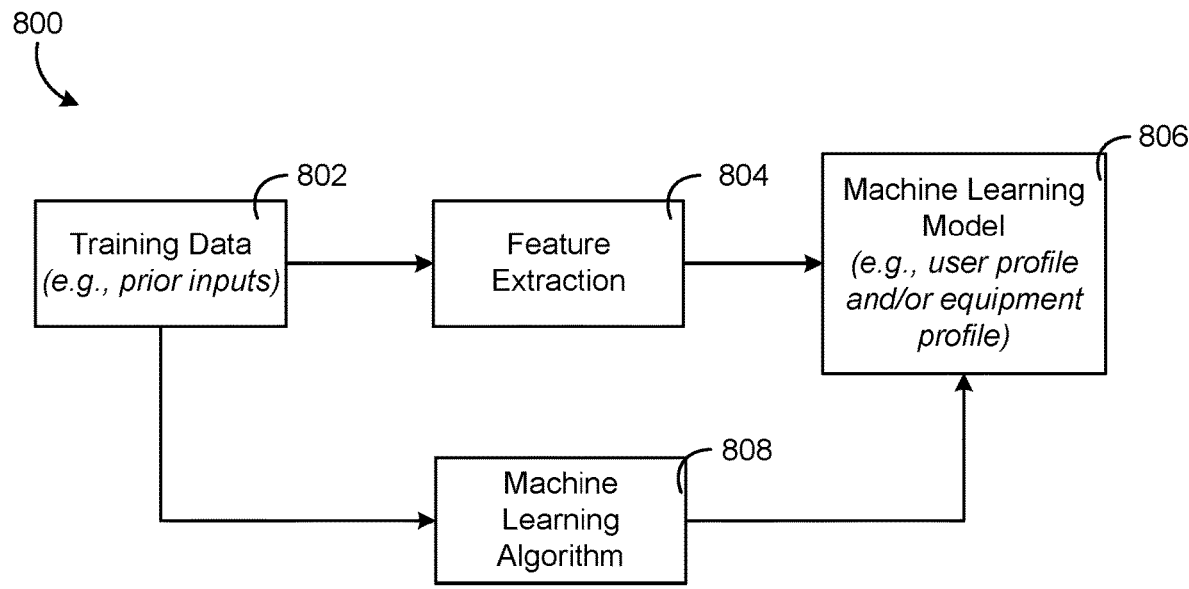
FIG. 8A is a block diagram of a machine learning training phase that may be implemented with a building threat assessment system (BTAS), according to some embodiments.
Figure 8B:
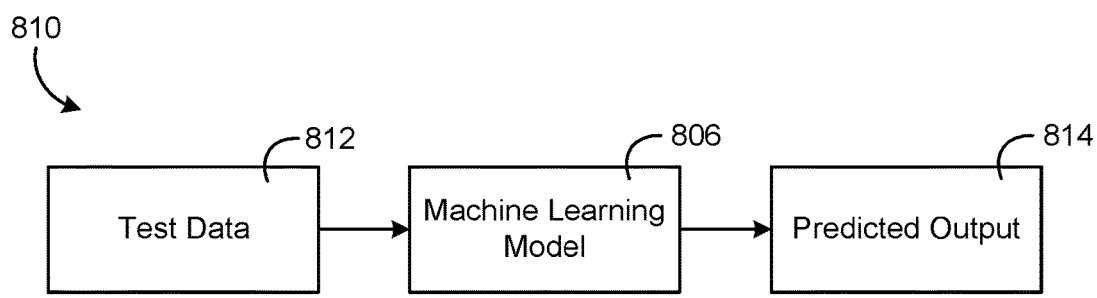
FIG. 8B is a block diagram of a machine learning testing phase that may be implemented with a building threat assessment system (BTAS), according to some embodiments.

Now referring to FIGS. 8A and 8B, a method 800 including a training phase for machine learning model 806 is shown, and a method 810 including a testing phase for machine learning model 806 is shown. In some embodiments, machine learning model 806 may be implemented in the profile module 542 as shown and described with reference to FIG. 6.

Referring to FIG. 8A, training data 802 may be used as an input to feature extraction block 804 and machine learning algorithm 808. In some embodiments, training data 802 may include prior user inputs and available prior use data. For example, the training data 802 may be the same inputs shown in FIG. 6 with respect to profile module 542. At feature extraction block 804, relevant data may be extracted from the training data. Machine learning model 806 may then be developed from the output of feature extraction block 804 and machine learning algorithm 808. Machine learning model 806 may include at least one user profile and/or at least one equipment profile associated with BMS 400.

Referring now to FIG. 8B, method 810 may include a testing phase for machine learning model 806. As shown, test data 812 is used as an input to machine learning model 806. Machine learning model 806 then generates a predicted output 814. The predicted output 814 may be compared to real outputs during method 810.

Notably, buildings may have various cycles that occur over time. For example, during building start-up and/or installation, many user inputs can occur that correspond to a plurality of equipment parameters. The user inputs may occur in a relatively short amount of time, and may come from several different users. Accordingly, BTAS 502 may intentionally have reduced functionality and/or be suspended entirely for preferred periods of time. As one non-limiting example, a building may have a holiday shutdown for the installation of new equipment. During the shutdown, dozens of new contractors will be submitting user inputs to various pieces of equipment. Accordingly, BTAS 502 may be suspended for the holiday shutdown, to prevent an excessive amount of verification requests.

In relation to the preceding paragraph, training data 802 may be limited to a specific period of time that corresponds to "normal" building function (e.g., typical user inputs to typical subsystems). Further, test data 812 may also be selected to correspond to "normal" building function.

Figure 9:
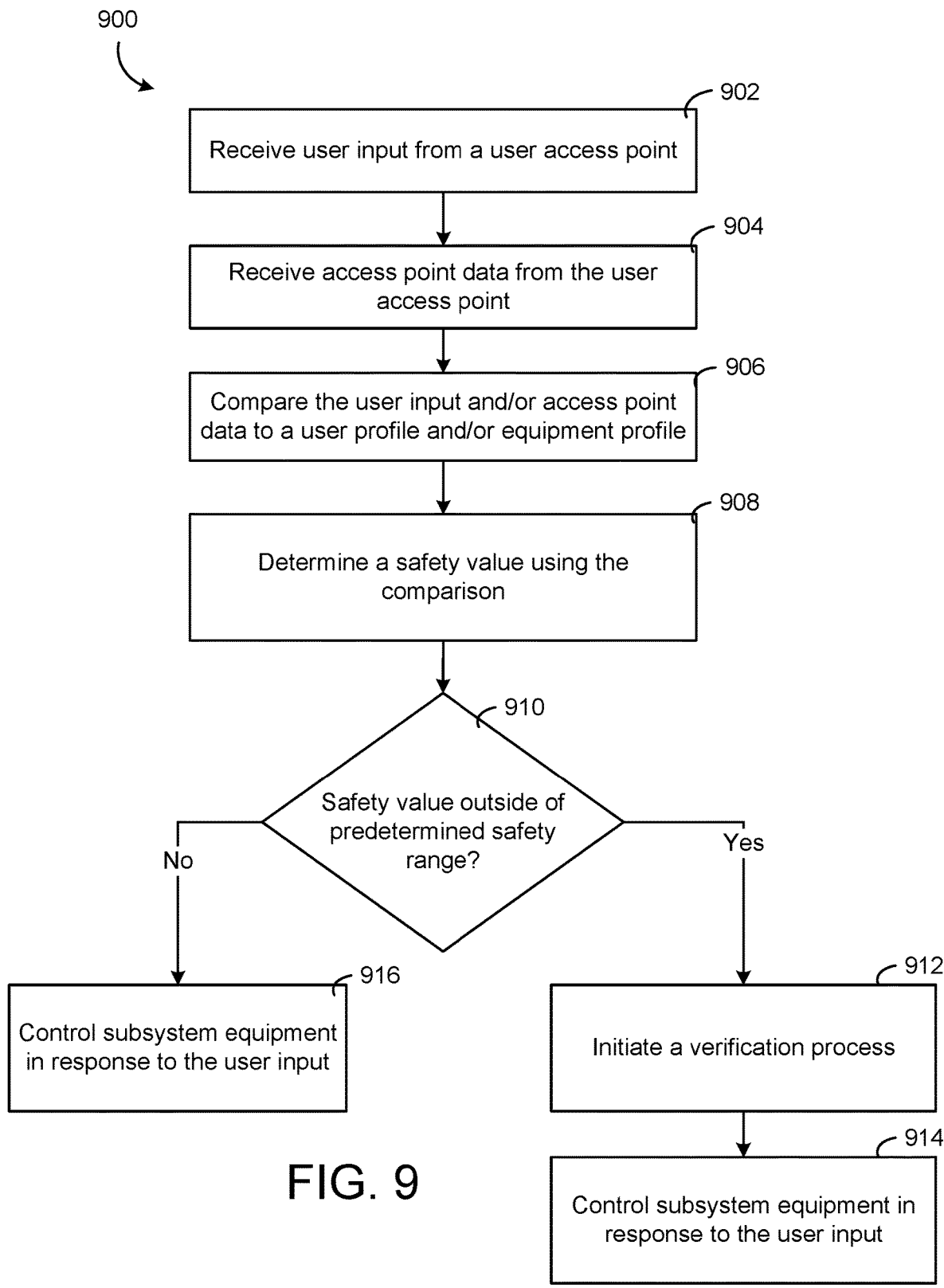
FIG. 9 is a flowchart of a user activity monitoring and assessment method, which may be performed by the BTAS of FIG. 5 and/or FIG. 6.

Referring now to FIG. 9, a flowchart of a monitoring and assessing method 900, which may be performed by BTAS 502 is shown. Alternatively, the monitoring and assessing method 900 may be performed by a different system or controller. Method 900 is shown to include receiving a user input from a user access point (step 902). Method 900 is shown to further include receiving access point data from the user access point (step 904). Additionally, method 900 is shown to include comparing the user input and/or the access point data to a user profile and/or equipment profile (step 906). Next, method 900 is shown to include determining a safety value using the comparison (step 908). The safety value is then compared to a predetermined safety range (step 910). If the safety value is outside of the predetermined safety range (i.e., the result of step 910 is "yes"), a verification process may be initiated (step 912). Once the verification process is completed, method 900 is shown to include controlling subsystem equipment in response to the user input (step 914).

Alternatively, if the safety value is within the predetermined safety range (i.e., the result of step 910 is "no"), method 900 is shown to include to include controlling subsystem equipment in response to the user input (step 916). Notably, if the safety value is within the predetermined safety range, no verification process may be initiated.

Figure 10:
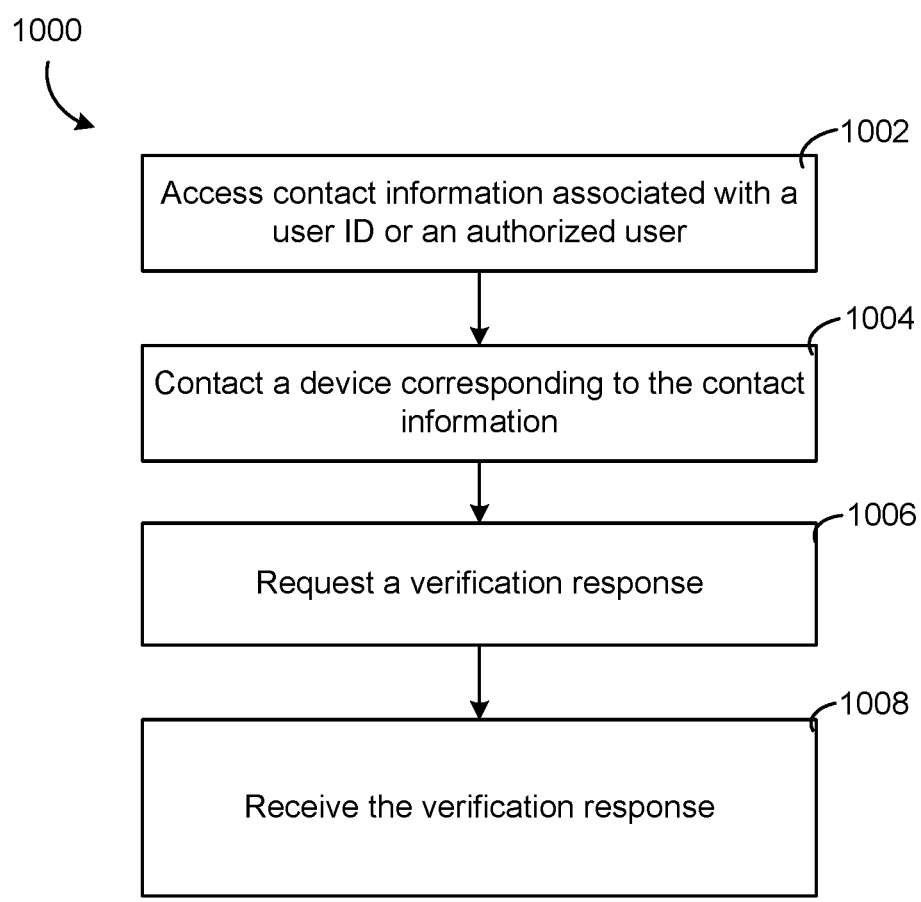
FIG. 10 is a flowchart of a verification process method, which may be performed by the BTAS of FIG. 5 and/or FIG. 6.

Referring now to FIG. 10, a flowchart of a verification method 1000, which may be performed by BTAS 502 is shown. Alternatively, the verification method 1000 may be performed by a different system or controller. In some embodiments, verification method 1000 may be performed to accomplish step 912 of FIG. 9 (i.e. initiating a verification process). Method 1000 is shown to include accessing contact information associated with a user ID or an authorized user (step 1002). Method 1000 is shown to further include contacting a device corresponding to the contact information (step 1004). Further, method 1000 is shown to include requesting a verification response (step 1006). Next, method 1000 is shown to include receiving the verification response (step 1008).

Figure 11:
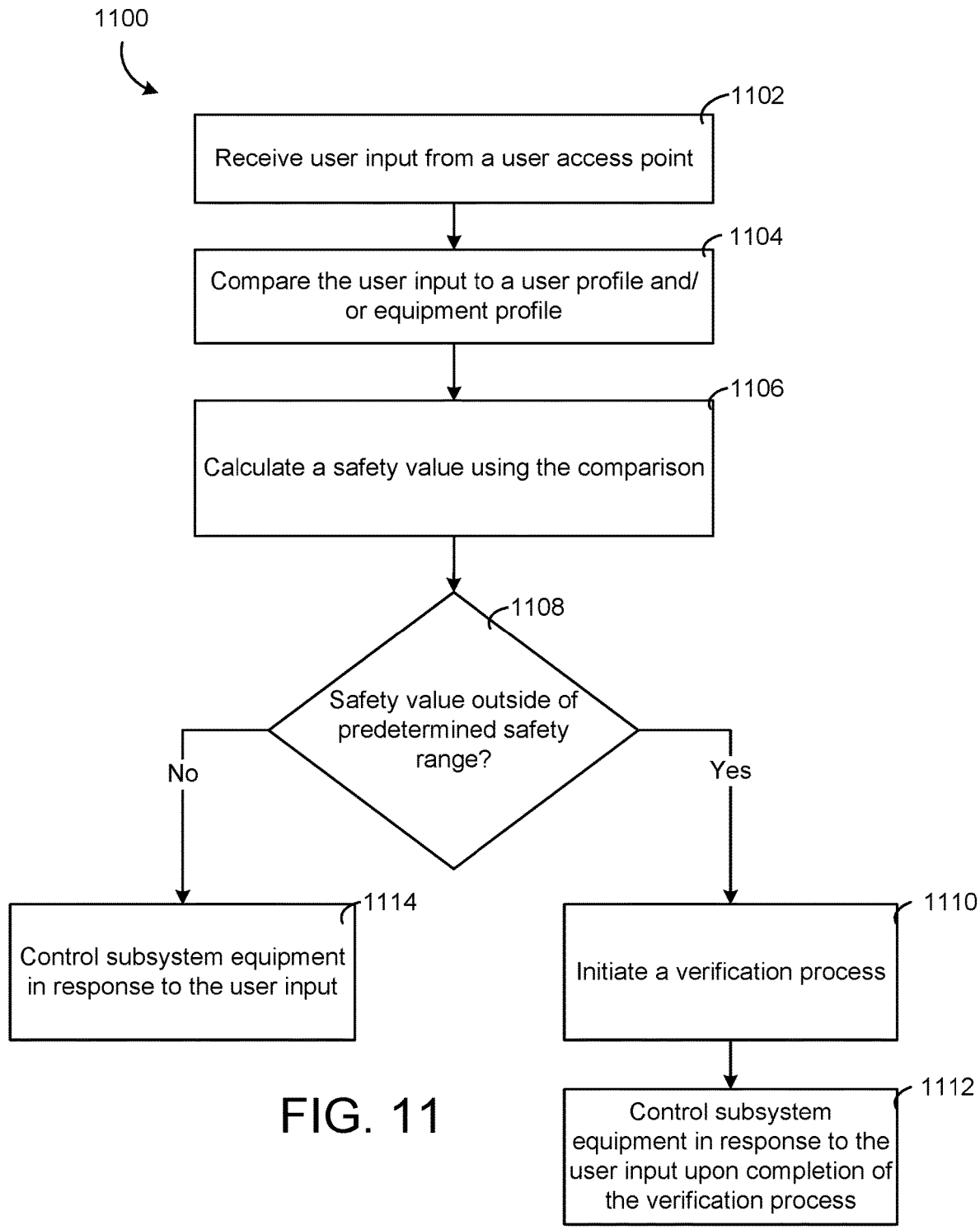
FIG. 11 is a flowchart of another user activity monitoring and assessment method, which may be performed by the BTAS of FIG. 5 and/or FIG. 6.

Referring now to FIG. 11, a flowchart of a monitoring and assessing method 1100, which may be performed by BTAS 502 is shown. Alternatively, the monitoring and assessing method 1100 may be performed by a different system or controller. Method 1100 is shown to include receiving a user input from a user access point (step 1102). Additionally, method 1100 is shown to include comparing the user input to a user profile and/or equipment profile (step 1104). Next, method 1100 is shown to include calculating a safety value using the comparison (step 1106). The safety value is then compared to a predetermined safety range (step 1108). If the safety value is outside of the predetermined safety range (i.e., the result of step 1108 is "yes"), a verification process may be initiated (step 1110). Once the verification process is completed, method 1100 is shown to include controlling subsystem equipment in response to the user input (step 1112). In some embodiments, verification method 1000 (as previously described) may be performed to accomplish step 1110.

Alternatively, if the safety value is within the predetermined safety range (i.e., the result of step 1108 is "no"), method 1100 is shown to include to include controlling subsystem equipment in response to the user input (step 1114). Notably, if the safety value is within the predetermined safety range, no verification process may be initiated.

Figure 12:
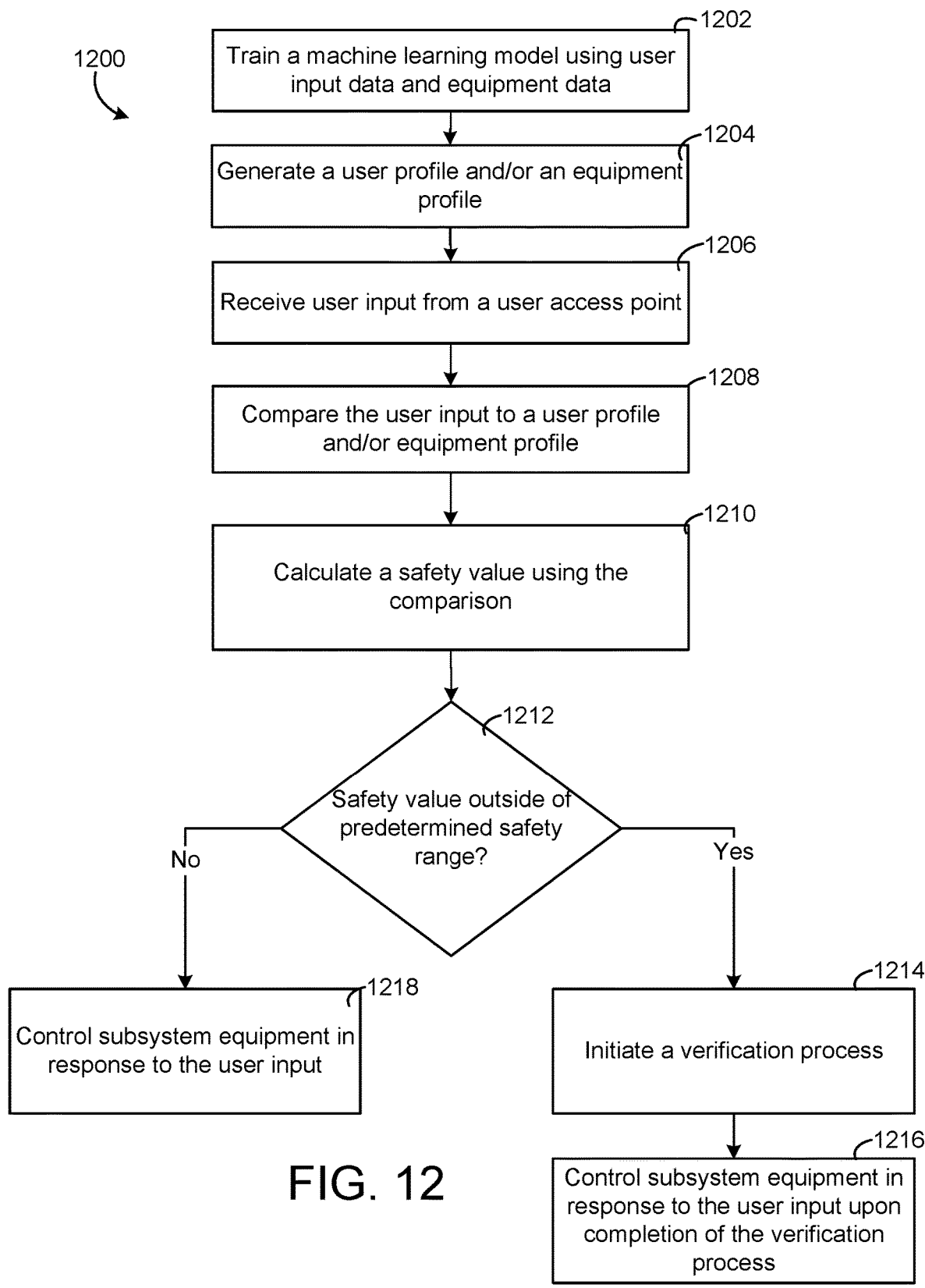
FIG. 12 is a flowchart of another user activity monitoring and assessment method, which may be performed by the BTAS of FIG. 5 and/or FIG. 6.

Referring now to FIG. 12, a flowchart of a monitoring and assessing method 1200, which may be performed by BTAS 502 is shown. Alternatively, the monitoring and assessing method 1200 may be performed by a different system or controller. Method 1200 is shown to include training a machine learning model using user input data and equipment data (step 1202). Method 1200 is shown to further include generating a user profile and/or an equipment profile (step 1204). Next, method 1200 is shown to include receiving a user input from a user access point (step 1206). Additionally, method 1200 is shown to include comparing the user input to a user profile and/or equipment profile (step 1208). Next, method 1200 is shown to include calculating a safety value using the comparison (step 1210). The safety value is then compared to a predetermined safety range (step 1212). If the safety value is outside of the predetermined safety range (i.e., the result of step 1212 is "yes"), a verification process may be initiated (step 1214). Once the verification process is completed, method 1200 is shown to include controlling subsystem equipment in response to the user input (step 1216). In some embodiments, verification method 1000 (as previously described) may be performed to accomplish step 1214.

Alternatively, if the safety value is within the predetermined safety range (i.e., the result of step 1212 is "no"), method 1200 is shown to include to include controlling subsystem equipment in response to the user input (step 1218). Notably, if the safety value is within the predetermined safety range, no verification process may be initiated.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS), the system comprising:
    a user access point configured to receive a user input corresponding to the BMS;
    at least one building subsystem in communication with the user access point and configured to control subsystem equipment in response to the user input; and
    a controller comprising an electronic processor and a memory and configured to:
        receive the user input, wherein the user input associated with a change to a parameter of the subsystem equipment;
        receive access point data corresponding to the user access point;
        compare the user input and access point data to at least one of a user profile and an equipment profile;

determine a safety value for the user input based on the comparison;

determine if the safety value is outside of a predetermined safety range, wherein the safety value is determined based at least in part upon whether the user input is atypical behavior for a user;

initiate a verification process in response to a determination that the safety value is outside of the predetermined safety range; and wherein the equipment within the BMS is controlled according to the user input, responsive to receiving a verification response.

2. The system of claim 1, wherein the access point data comprises at least one of a user ID, a time corresponding to the user input, and an access point location.

3. The system of claim 2, wherein the user profile corresponds to the user ID and comprises a user access level.

4. The system of claim 1, wherein the access point data comprises a user ID corresponding to the user profile, the verification process executed by the controller and further comprising:

accessing contact information associated with at least one of the user ID and an authorized user;

contacting a device corresponding to the contact information and requesting the verification response; and controlling the subsystem equipment using the user input upon receipt of the verification response.

5. The system of claim 1, wherein the safety value comprises factors associated with at least one of impact of user input, frequency of user input, speed of user input, location of user input, and type of user input.

6. The system of claim 1, further comprising a machine learning module configured to generate the at least one user profile and equipment profile using a machine learning algorithm.

7. The system of claim 6, wherein the machine learning algorithm uses training data corresponding to prior user inputs.

8. The system of claim 1, further comprising a first building subsystem with a first predetermined safety range and a second building subsystem with a second predetermined safety range, the second predetermined safety range different than the first predetermined safety range.

9. A method for monitoring and assessing user activity in a building management system (BMS), the method comprising:

receiving a user input from a user access point, wherein the user input relates to a change to a parameter of equipment within the BMS using an electronic processor of the BMS;

receiving access point data corresponding to the user access point using the electronic processor;

calculating a safety value for the user input using the user input, the access point data, and at least one of a user profile and an equipment profile using the electronic processor;

determining if the safety value is outside of a predetermined safety range using the electronic processor; and responding to a determination that the safety value is outside of the predetermined safety range by:
initiating a verification process;
receiving a verification response;
controlling the equipment within the BMS according to the user input, responsive to receiving the verification response; and updating at least one of the user profile and the equipment profile based on the user input.

10. The method of claim 9, wherein the access point data comprises at least one of a user ID, a time corresponding to the user input, and an access point location.

11. The method of claim 10, further comprising the user profile corresponding to the user ID and including a user access level.

12. The method of claim 11, wherein the verification process further comprises:

accessing contact information associated with the user ID; and contacting a device corresponding to the contact information and requesting the verification response.

13. The method of claim 11, further comprising assigning weights to safety value criteria, the safety value criteria comprising at least one of user access level and predicted impact of controlling the equipment parameter.

14. The method of claim 9, further comprising generating the at least one user profile and equipment profile using a machine learning model.

15. The method of claim 14, further comprising using prior user inputs as training data for a machine learning algorithm.

16. A method of monitoring and assessing user activity in a building management system (BMS), the method comprising:

receiving a user input from a user access point, wherein the user input is related to a change to a parameter of equipment within the BMS;

calculating a safety value for the user input using the user input, the access point data, and at least one of a user profile, and an equipment profile using an electronic processor;

determining if the safety value is outside of a predetermined safety range using the electronic processor; and responding to a determination that the safety value is outside of the predetermined safety range using the electronic processor by:
initiating a verification process;
controlling the equipment within the BMS according to the user input upon completion of the verification process; and
updating at least one of the user profile and the equipment profile based on the user input.

17. The method of claim 16, wherein the equipment parameter corresponds to a building subsystem, the building subsystem comprising at least one of fire safety, lighting, lifts and escalators, security, HVAC, electrical, and information communication technology (ICT).

18. The method of claim 16, wherein the verification process comprises contacting an authorized user using at least one of email, text message, and automated phone call.

19. The method of claim 18, wherein the verification process further comprises receiving a verification response from the at least one email, text message, and automated phone call prior to controlling the equipment parameter.

20. The method of claim 16, further comprising:
training a machine learning model using user input data and equipment data; and
generating the at least one user profile and equipment profile using the machine learning model.

* * * * *